United States Patent [19]

Brown

[11] Patent Number: 4,737,984
[45] Date of Patent: Apr. 12, 1988

[54] DIAL TONE DETECTOR

[75] Inventor: Anthony K. D. Brown, Kanata, Canada

[73] Assignee: Northern Telecom Limited, Montreal, Canada

[21] Appl. No.: 936,563

[22] Filed: Dec. 1, 1986

[51] Int. Cl.⁴ .......................................... H04M 1/27
[52] U.S. Cl. .................... 379/372; 379/386; 379/355; 328/138
[58] Field of Search ............... 379/40, 69, 372, 387, 379/355, 356, 359, 377, 386, 200, 280, 283, 354; 381/46; 328/138

[56] References Cited

U.S. PATENT DOCUMENTS

| | | | |
|---|---|---|---|
| 3,959,600 | 5/1975 | Sousa | 379/157 |
| 4,061,885 | 12/1977 | Nash et al. | 379/283 |
| 4,142,177 | 2/1979 | Davis | 379/386 |
| 4,246,445 | 1/1981 | Hayasaka et al. | 379/200 |
| 4,405,833 | 9/1983 | Cave et al. | 379/372 |
| 4,439,639 | 3/1984 | Munter | 379/386 |
| 4,567,328 | 1/1986 | Carrasco et al. | 379/100 |
| 4,675,898 | 6/1987 | Bellenger | 379/356 X |

OTHER PUBLICATIONS

*IBM Technical Disclosure Bulletin,* "Call Progress Tone Processor", vol. 29, No. 12, pp. 5571–5573, (May 1987).

*Primary Examiner*—James L. Dwyer

[57] ABSTRACT

A dial tone detector is provided possessing a precise definition of a passband. In one example, virtually infinite roll off is achieved in less than 5 hertz. An incoming analog signal of at least a predetermined amplitude is limited to produce square wave pulses which are counted in a first counter over a period of time determined by a periodic RESET signal. A READ signal occuring just before the RESET signal causes either a valid count state or an invalid count state to be stored depending upon the value of the count in the first counter. When a valid count state is in storage, a second counter counts timing pulses while the valid count state persists, whereby in the second counter a count of greater than a predetermined number indicates the presence of dial tone.

3 Claims, 2 Drawing Sheets

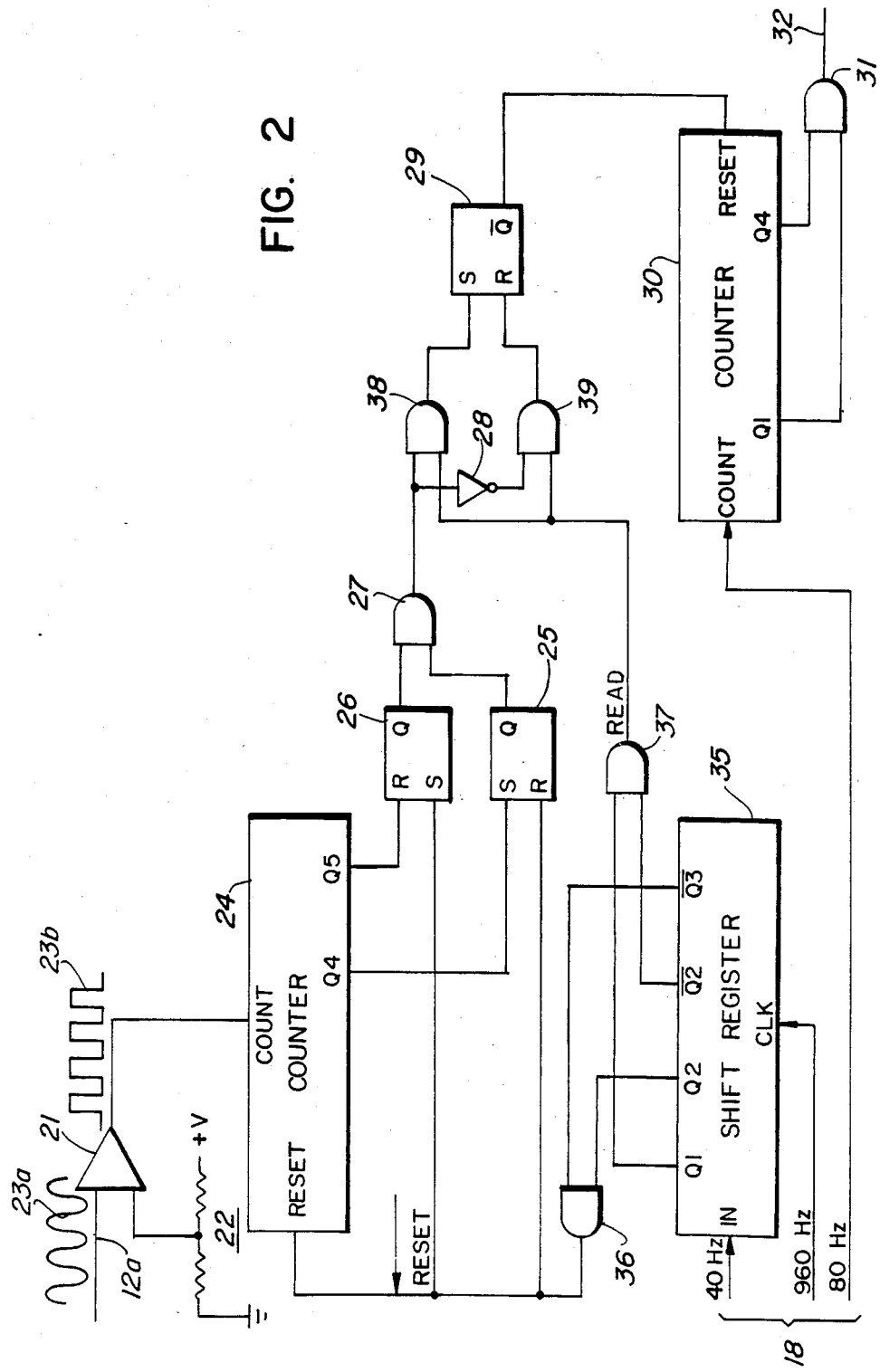

DIAL TONE DETECTOR

FIELD OF THE INVENTION

The invention is in the field of telephony signal detectors and more particularly relates to a dial tone detector useful for detection of dial tones of various known standards.

BACKGROUND OF THE INVENTION

The development of electronic telephone station sets has heralded the introduction of many telephony features heretofore not readily available to the general public. Some examples of these features are repetory dialing, last number redial and saved number redial. Each of these features requires that dial tone be present on the telephone line before the feature is invoked. Otherwise a premature transmission of dialing digits to an associated telephone central office exchange will result in an incompletely dialed number and failure to achieve connection to a desired party. Many such features include a time delay before dialing such that in typical operation adequate time is provided between the OFF HOOK condition and the commencement of dialing. However, as is observed by Henry P. Sousa in U.S. Pat. No. 3,959,600 issued with the title "Remotely Programmable Call Diverter" on May 25, 1976, "Prior art devices have also failed to function well in a variety of telephone environments because of simple timing problems. As an example, the time it takes a telephone central exchange to furnish a dial tone to a subscriber varies widely from exchange to exchange, partially as a function of the equipment in the exchange and partially as a function of the volume of calls being handled at the time. Some prior art devices have initiated dialing solely as a function of time, and lost calls because of the failure to wait for a dial tone."

Of course the obvious solution is to provide the featured telephone station set with a dial tone detector such that receipt of dial tone is assured before dialing is commenced. The requirements of such a dial tone detector are that of detecting dial tone of a minimal continuous duration of about ¼ second or more, and the detected dial tone must be distinguished from other intermittent tones within a dial tone passband. The dial tone passband must be broad enough to include at least the following types of dial tone if the feature telephone set is to be useable without restriction by various operating telephone companies. For example, in North America, at least three dial tone signal standards are in use. These are:

(1) Precise dial tone used on more recent switches and private branch exchanges. This is 350 hertz and 440 hertz combined;

(2) 600 hertz modulated by 120 hertz or 133 hertz. This is used on step-by-step switches, and so is an application for pulse dialing; and (3) 400 hertz single frequency, which is used by some common carriers.

In a dial tone detector using a typical analog filter, a passband covering a range of at least 350 hertz to 733 hertz is required to detect and respond to any and all of these dial tone signals. Such an analog filter has disadvantages in that it can pass energy generated by DTMF signalling and requires bulky reactive components for its construction.

It is an object of the invention to provide dial tone detection with very sharply defined passband limits such that any of these dial tones can be detected without erroneously detecting DTMF signalling.

It is also an object of the invention to detect any of these dial tone occurrences within a fraction of a second, such that no undue or irksome delay of function is attributable to the telephone station set.

SUMMARY OF THE INVENTION

A dial tone detector in accordance with the invention includes a first means for generating signal pulses in response to an incoming analog signal of at least a predetermined amplitude. A first counter is used to count each signal pulse which occurs between occurrences of a RESET signal. A storage means stores one of a valid count state and an invalid count state in response to the count in the first counter at each instant of an occurrence of a READ signal. A second counter is used to count timing pulses between occurrences of an invalid count state in the storage means, whereby in the second counter a count of greater than a predetermined number indicates the presence of a dial tone in the incoming analog signal.

An example of a dial tone detector for discriminating a dial tone in an analog signal, in accordance with the invention, includes a timing circuit for generating a READ signal followed by a RESET signal at a predetermined rate, and a limiter for generating a square wave signal, when the analog signal is of at least a predetermined amplitude. A first counter counts the square wave signal between occurrences of the RESET signal. A first bistable circuit is connected to be set to a first state in response to a count in the first counter being a first number and to be set to a second state in response to the RESET signal. A second bistable circuit is connected to be set to a first state in response to an occurrence of the RESET signal and to be set to a second state in response to a count in the first counter being a second number greater than the first number. A logic circuit is connected to indicate a first state in response to the first and second bistable circuits being in the first state at the same time, and otherwise to indicate a second state. A gating circuit is connected between an output of the logic circuit and an input of a third bistable circuit, for causing the third bistable circuit to store an instant state of the logic circuit in response to and coincident with each occurrence of the READ signal. A second counter is connected to count a timing signal, having a repetition rate of at least twice the repetition rate of the READ and RESET signals, in response to a state corresponding to the first state of the logic circuit being stored by the third bistable circuit. A decoder is connected to be responsive to a count, in the second counter, being equal to at least one predetermined number for asserting a signal for indicating the presence of the dial tone in the analog signal.

A method for detecting dial tone, in an analog signal, in accordance with the invention includes generating interleaved READ and RESET signal pulses, generating timing signal pulses of at least a pulse repetition rate of the READ signal pulses, and, generating square wave signal pulses in response to the analog signal being of at least a predetermined amplitude. The square wave signal pulses are counted for a period of time which is defined by consecutive occurrences of the RESET signal pulses. A first state indicating valid count is stored at a moment of an occurrence of a READ signal if the count of the square wave signal pulses is in a predetermined range. Only while the first state is stored the timing signal pulses are counted and a timing signal count of at least a predetermined number indicates the presence of dial tone in the analog signal.

BRIEF DESCRIPTION OF THE DRAWINGS

An example embodiment is discussed with reference to accompanying drawings in which:

FIG. 2 is a block schematic diagram of a dial tone detector in accordance with the invention.

DESCRIPTION OF THE EXAMPLE EMBODIMENT

Figure 1:
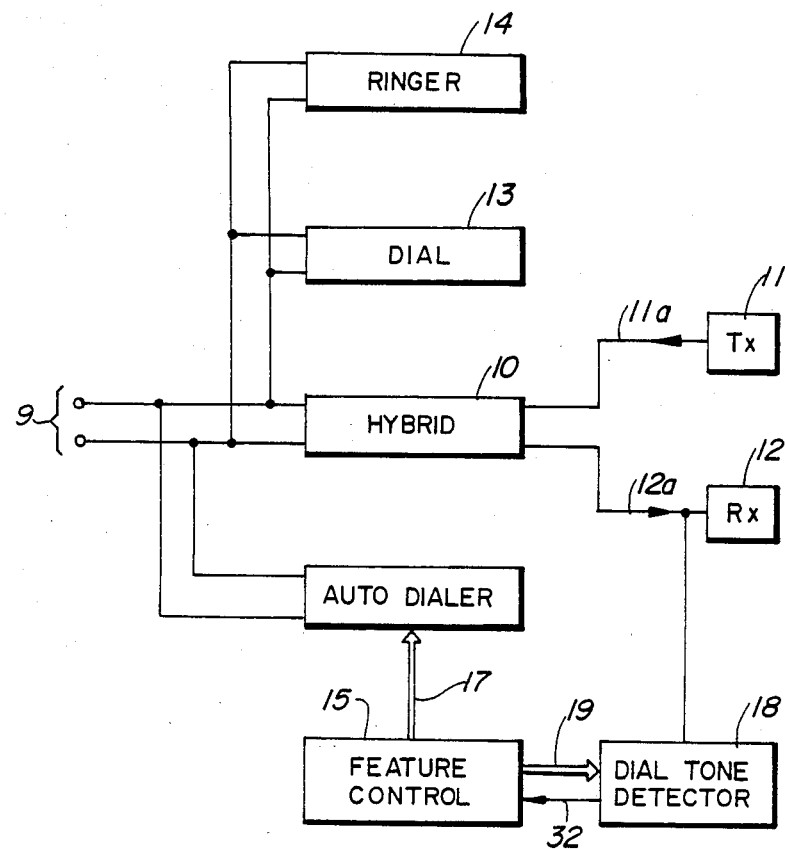
FIG. 1 is a block schematic diagram of a telephone station set including an automatic dial feature wherein a dial tone detector is useful.

The telephone station set in FIG. 1 is but one general exemplary form which is well known to persons skilled in the telephony arts. However, operation of the illustrated telephone set is briefly reviewed for the convenience of the reader. The telephone station set is connected to a central office exchange, private branch exchange or the like (not shown) by a loop circuit or telephone line (not shown) via terminals 9. A hybrid circuit 10 passes voice band analog signals from the terminals 9 to a receiver 12 via a signal path 12a, and passes voice band analog signals from a transmitter 11, connected via a signal path 11a, to the terminals 9. When the telephone station set is in an ON HOOK condition, ringing signals, appearing at the terminals 9, generate an audible sound via a ringer 14 to signify an incoming telephone call. To initiate an outgoing telephone call, the telephone station set is in the OFF HOOK condition. A dial tone, audibly perceived via the receiver 12, indicates that the associated exchange is ready to receive dialing information which may be provided through a dial 13 or by an automatic dialer 16. The automatic dialer 16 is controlled by a feature controller 15 connected thereto via a bus 17. The feature controller 15 enables the automatic dialer 16 to dial a preselected telephone number, when so requested, in response to the telephone set being placed in the OFF HOOK condition and an initial indication on a lead 32, that dial tone is detected by a dial tone detector 18. In this particular example, it was convenient that the feature controller provide various timing signals for operation of the dial tone detector 18, via a bus 19. The dial tone detector is illustrated in more detail in FIG. 2.

Referring to FIG. 2, signals 23a received from the signal path 12a, are connected to a comparator which consists of an amplifier 21 and threshold circuit 22. When the signals 23a are in excess of a given minimum amplitude, the comparator amplifies and limits the signals to form a 'square' waveform as illustrated at 23b.

A digital binary counter 24 utilizes the 'square' waveform as a clock to increment itself. Two outputs of the counter 24 (Q4 and Q5) operate bistable logic circuit elements, in this example SET/RESET flipflops 25 and 26, to record when the counter 24 has passed counts of 8 and 16. Other values of the counter 24 could be used. The actual values determine a passband of the dial tone detector. Since the counts are relatively low, a five bit counter is sufficient. A valid input signal is one which causes the counter 24 to exceed a count of seven but to be of less than a count of sixteen after counting for a sample period of 23.96 milliseconds. Timing waveforms are generated by a shift register 35 and two timing signals having frequencies of 40 hertz and of 960 hertz.

These timing signal frequencies were chosen since they were readily available in the particular telephone station set for which this the dial tone detector is intended. The circuit is such that two signals are generated, a READ signal and a RESET signal at an output of an AND gate 37 and an AND gate 36, respectively. These signals occur every 25 milliseconds. The READ signal occurs just before the RESET signal and both of them occur within a period of one cycle of the 960 hertz timing signal. By means of these signals the counter 24 and the SET/RESET flipflops 25 and 26 are reset and set respectively every 25 milliseconds. The states of the flipflops 26 and 25 are ANDed by an AND gate 27. The ANDed state is supplied to an AND gate 38 and via an inverter 28 to an AND gate 39. The AND gates 38 and 39 pass the ANDed state to a SET/RESET flipflop 29, with each occurrence of the READ signal, that is just prior to the RESET signal. If the signal 23a is of sufficient amplitude and is in the passband of interest this results in a count of between eight and fifteen. This is a valid count state which is stored in the flipflop 29. Thus the flipflop 29 contains a continuous monitor of the signal 23a, which is updated every 25 milliseconds. While the output of the flipflop 29 indicates a valid state, a second four bit counter 30 is incremented by an 80 hertz timing signal. Outputs Q1 and Q4 of the counter 30 are decoded by an AND gate 31. If the second counter 30 reaches a count of nine, this occurrence is asserted by an output of the AND gate 31 on a lead 32 to indicate that the frequency of the input signal 23a remained within the passband of interest for at least 250 milliseconds and hence that therefore the input signal is a valid dial tone.

Although the first counter 24 limits the minimum acceptable count to eight, an incoming signal having a period of one seventh of the sampling interval could just create a count of eight if the phase of the signal in relation to the sampling interval permits it. Such a signal however, will not be accepted as a valid dial tone since during the 250 millisecond time interval of the second counter 30 the phase of the incoming signal will change and the signal will fail to relatively produce a count of eight in the first counter 24.

As discussed in the foregoing, the dial tone detector operates by detection of a presence of energy in a precisely defined passband. The roll off at the edge of the passband is desirable and extremely steep as is demonstrated in the following discussion.

The 25 millisecond sampling rate consists of a 23.96 millisecond sampling interval and a 1.04 millisecond period of generating the READ and RESET signals. A continuously valid input signal must produce a minimum count of eight in 23.96 millisecond, and thus have a minimum frequency of 333.9 hertz. Over a 250 millisecond validation period, the signal must process through 83.47 cycles.

The lowest frequency signal which might appear as valid over the validation period would be such that phase shift would cause it to be invalid on the sampling interval following the 250 millisecond minus the 1.04 millisecond used for the READ and RESET signals, or 248.96 milliseconds. Thus for this lowest frequency, the phase in relation to the 25 millisecond sampling period would shift by almost 23.96 millisecond in 248.96 millisecond or 2.306 milliseconds in 23.96 milliseconds. In relation to a single cycle of the 333.9 hertz signal calculated above this represents a frequency shift of:

$$333.9 \times 2.306/8 \times 23.96 = 4.016 \text{ hertz}$$

Thus the lowest frequency that might appear as a valid dial tone signal, given an appropriate phase relationship to the sampling period is 333.9−4.02 hertz, or 329.9 hertz. Thus the low frequency cutoff of the filter is extremely steep, progressing to complete cutoff in approximately 4 hertz.

By a similar process of reasoning, the higher frequency which might appear as valid over the validation period is considered. If the maximum count of the input signal during a 23.96 sampling interval is fifteen, the high frequency cutoff is 626 hertz. Frequencies slightly above 626 hertz might be passed as valid, if their phase in relation to the sampling interval is appropriate. The maximum frequency shift above 626 hertz which might be passed in this way is:

$$626 \times 2.306/15 \times 23.96 = 4.016 \text{ hertz}$$

Thus the high frequency cutoff of the filter is extremely steep, progressing to complete cutoff in approximately 4 hertz.

The circuit in FIG. 2, meets the requirements of a dial tone detector circuit having very strong discrimination against tone frequencies outside the passband of interest. The circuit in FIG. 2 also represents a very economical realization of a dial tone detector in terms of transistor gate count and silicon area utilized if implemented in an integrated circuit form.

What is claimed is:

1. A dial tone detector for discriminating a dial tone in an analog signal, comprising:
   a limiter for generating a square wave signal when the analog signal is of at least a predetermined amplitude;
   a timing circuit for generating a READ signal followed by a RESET signal, at a predetermined rate;
   a first counter for counting the square wave signal between occurrences of the RESET signal;
   a first bistable circuit connected to be set to a first state in response to a count in the first counter equaling a first number and to be set to a second state in response to the RESET signal;
   a second bistable circuit connected to be set to a first state in response to an occurrence of the RESET signal and to be set to a second state in response to a count in the first counter being a second number greater than the first number;
   logic means for indicating a first state in response to the first and second bistable circuits being in the first state at the same time and otherwise for indicating a second state;
   a third bistable circuit;
   a gating circuit being connected between an output of the logic means and an input of the third bistable circuit for causing the third bistable circuit to store an instant state of the logic means in response to and coincident with each occurrence of the READ signal;
   a second counter for counting a timing signal, having a repetition rate of at least twice the repetition rate of the READ and RESET signals, in response to a state corresponding to the first state of said logic means being stored by the third bistable circuit; and
   a decoder being responsive to a count in the second counter being equal to at least one predetermined number for asserting a signal for indicating the presence of the dial tone in the analog signal.

2. A method for detecting a dial tone in an analog signal being received at a telephone station set comprising the steps of:
   (a) generating periodic interleaved READ and RESET signal pulses and generating timing signal pulses of at least twice a pulse repetition rate of the READ signal pulses;
   (b) generating square wave signal pulses in response to the analog signal being of at least a predetermined amplitude;
   (c) counting occurrences of the square wave signal pulses between occurrences of the RESET signal pulses;
   (d) storing a first state indicating a valid count in response to the counting of step (c) resulting in a count being within a predetermined range at a moment of an occurrence of the READ signal; and
   (e) counting the timing signal pulses only while the valid count indication is continuously stored, whereby a presence of the dial tone in the analog signal is indicated by a count value of at least a predetermined number.

3. In a telephone station set including an automatic dialer, a dial tone detector and a feature controller, for generating first timing signals for operation of the dial tone detector, and being responsive to an indication from the dial tone detector, for generating second timing signals for dialing operation of the automatic dialer, the dial tone detector comprising:
   a limiter for generating a square wave signal when the analog signal is of at least a predetermined amplitude;
   a timing circuit for generating a READ signal followed by a RESET signal, at a predetermined rate, in response to at least one of the first timing signals from the feature controller;
   a first counter for counting the square wave signal between occurrences of the RESET signal;
   a first bistable circuit connected to be set to a first state in response to a count in the first counter equaling a first number and to be set to a second state in response to the RESET signal;
   a second bistable circuit connected to be set to a first state in response to an occurrence of the RESET signal and to be set to a second state in response to a count in the first counter being a second number greater than the first number;
   logic means for indicating a first state in response to the first and second bistable circuits being in the first state at the same time and otherwise for indicating a second state;
   a third bistable circuit;
   a gating circuit being connected between an output of the logic means and an input of the third bistable circuit for causing the third bistable circuit to store an instant state of the logic means in response to and coincident with each occurrence of the READ signal;
   a second counter, having a count input being connected to the feature controller for receiving another of said first timing signals wherein said another timing signal is of a repetition rate of at least twice the repetition rate of the READ signal, the second counter being responsive to a state, corresponding to the first state of said logic means being stored by the third bistable circuit, for counting said another timing signal; and
   a decoder being responsive to a count in the second counter being equal to at least one predetermined number for asserting said indication from the dial tone detector.

* * * * *